United States Patent [19]
Corballis et al.

[11] Patent Number: 5,512,892
[45] Date of Patent: Apr. 30, 1996

[54] HAND HELD CONTROL DEVICE

[75] Inventors: Liam P. Corballis, Smithsburg, Md.;
Joseph D. Rutledge, Mahopac, N.Y.;
Edwin J. Selker, Palo Alto, Calif.

[73] Assignee: International Business Machines Corporation, Armonk, N.Y.

[21] Appl. No.: 202,928

[22] Filed: Feb. 25, 1994

[51] Int. Cl.⁶ ............................................. H03K 17/94
[52] U.S. Cl. ........................... 341/22; 341/20; 341/21; 273/148 R; 345/161
[58] Field of Search .................................. 341/20, 21, 22, 341/23, 24; 345/161, 156, 167; 364/709.9; 273/148 B, 148 R

[56] References Cited

U.S. PATENT DOCUMENTS

| | | | |
|---|---|---|---|
| 4,748,441 | 5/1988 | Brzezinski | 273/148 B |
| 4,836,700 | 6/1989 | Jensen | 400/489 |
| 4,969,647 | 11/1990 | Mical et al. | 273/DIG. 28 |
| 5,432,510 | 7/1995 | Matthews | 341/20 |

*Primary Examiner*—John K. Peng
*Assistant Examiner*—Ashok Mannava
*Attorney, Agent, or Firm*—Mark A. Wurm; Ronald L. Drumheller

[57] ABSTRACT

A hand held control device formed as a rigid body adapted to be gripped and carried by a single hand of a user and comprising a plurality of control elements operable by the thumb or a finger of the user's hand gripping and carrying the body, a pointing stick and a chirality detector for sensing whether a right or left hand is gripping and carrying the body for controlling the flow of information to or from a computer.

4 Claims, 4 Drawing Sheets

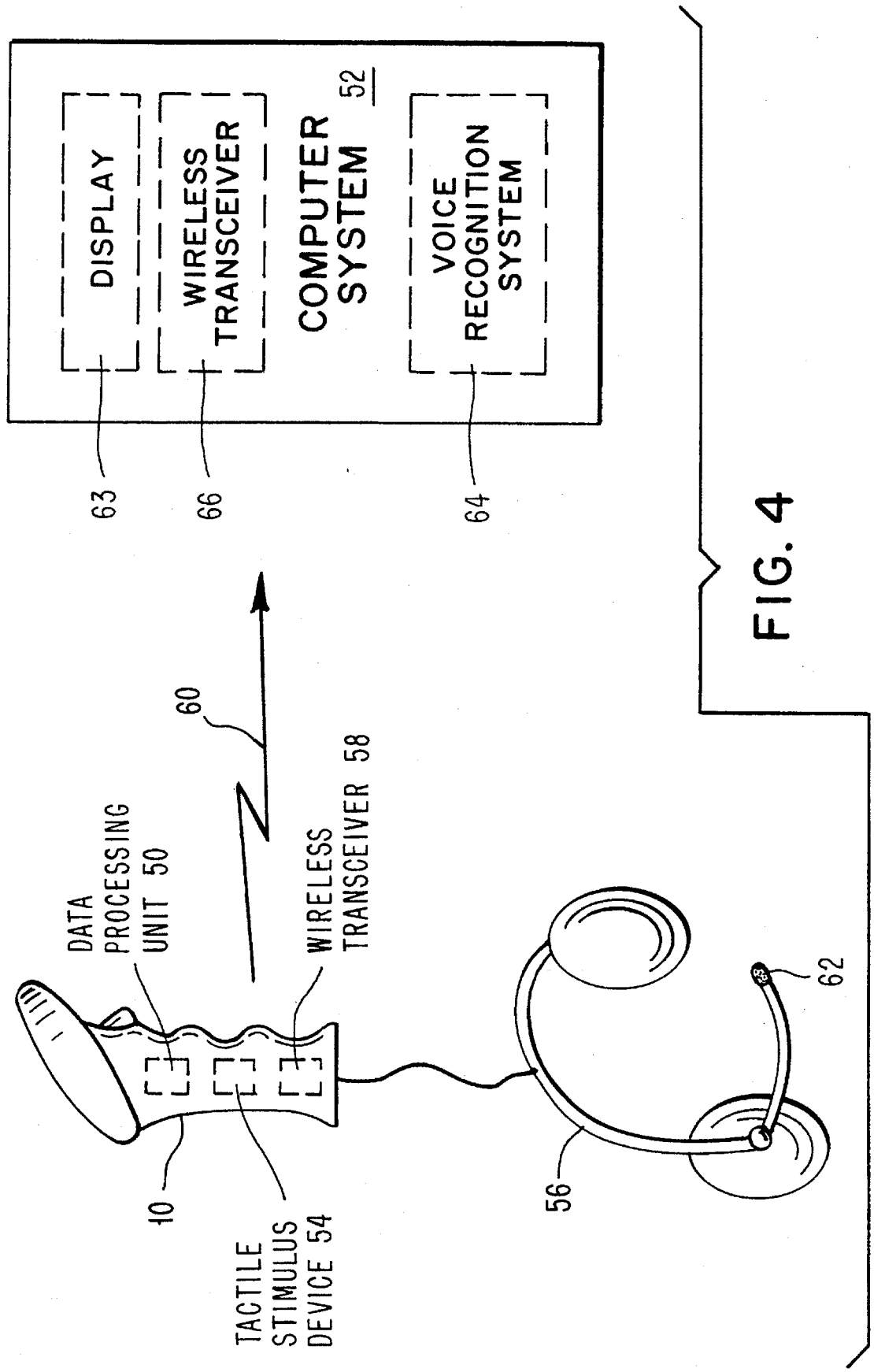

HAND HELD CONTROL DEVICE

This invention was made with Government support under contract number DTFA01-88-C-00042, awarded by the Department of Transportation. The Government has certain rights in this invention.

BACKGROUND OF THE INVENTION

1. Technical Field

The invention disclosed broadly relates to a device for selecting, switching and controlling operations in a telecommunications environment. More particularly, the invention is a hand held control device for controlling multiple simultaneous communications between an operator and both humans and machines, while allowing the operator to move freely about and to direct his attention to an external situation. Tactile activated analog as well as digital communication channels are made available to the operator.

2. Background Art

In situations such as airport ground traffic control, an operator must communicate simultaneously with both humans and machines while remaining free to move about and to direct most of his attention to the external situation. This communication is by a variety of sensory and motor modalities. In situations of airport ground traffic control or similar situation, one or more human must keep track of a fluid and complex situation by all available channels, including direct observation requiring limited mobility, and simultaneously interact with multiple humans and machines, including those serving to support them with external memory, data and computational power. The requirement of mobility precludes the use of conventional keyboards or pointing devices. What is needed is a means for providing this interaction with minimal interference with the operator's visual and cognitive focus.

OBJECTS OF THE INVENTION

It is an object of this invention to provide a hand held device which can be used with one hand for long periods of time without discomfort or fatigue.

It is also an object of this invention to provide a means of transmitting and receiving high quality voice signals from a user's headset to or from one or more sets of destinations selected through the device.

It is a further object of the invention to allow the user to point to objects on a display screen with a precision matching the user's visual resolution as quickly and easily as if the user were using a conventional pointing device, such as a mouse.

It is a still further object of the invention that the hand held control device accept and transmit a variety of key activated inputs.

It is yet another object of the invention that the hand held control device deliver tactile stimuli to the user's hand to signal actions taken place or needed.

It is desirable that these objects be achieved while making minimal physical and cognitive demands on the user consistent with its function. In particular, controls should be located in groups according to functionality.

SUMMARY OF THE INVENTION

These objects, features and other advantages are achieved by the hand held control device 10 shown in FIG. 1A and having a body shaped to fit comfortably in a partially closed gripping and carrying single hand of a size such that the middle joints of the fingers lie over the front center line of the body while the thumb is aligned with a back center line, so that the device 10 is held securely without the aid of the outer two joints of the thumb and the outer joints of the fingers. The body has an expanded top supporting a plurality of control elements on a concave surface, convenient to the thumb. Beneath the top, on the front center line of the body and under the middle joint of the index finger, is placed a multiposition control element or trigger switch 22 (FIG. 2). Optionally, two sets of control elements or switches 18a, 18b (FIG. 1A) corresponding to a right gripping and carrying hand and a left gripping and carrying hand respectively may be placed beneath the tips of the other three fingers with provision for sensing in which hand (left or right) the device is held, and automatically enabling one or the other set of these switches accordingly.

The top surface of the body supports switches accessible to the thumb and includes one or more analog input devices which provide signals determined by the forces applied by the thumb, in up to three dimensions. All the devices on the top surface should of a size and conformance suitable for operation by the thumb, with the desired degree of independence.

Inertial impulse devices located in the interior of the body can give several distinct tactile signals, distinguished by a direction of first or principal motion or by vibrational frequency.

Data processing unit 50 such as analog to digital conversion means, can be located in the interior of the body to accept the signals from the various sensors or control elements and transform them as required for transmission to the host system 52, and accept signals from the host 52, which includes a display 53 for activation of the tactile stimulus devices 54 and as voice channels for presentation through a headset 56. This transmission between host 52 and device 10 can be by hardwire or by any available wireless transceiver means 58, using electromagnetic radiation 60 at frequencies between radio and infrared. The transmission means must be nondirectional and immune to blocking by objects expected to be in the environment.

BRIEF DESCRIPTION OF THE DRAWINGS

FIG. 4 is a schematical representation of a complete system in accordance with this invention.

DETAILED DESCRIPTION OF THE PREFERRED IMPLEMENTATION

Figure 1A:
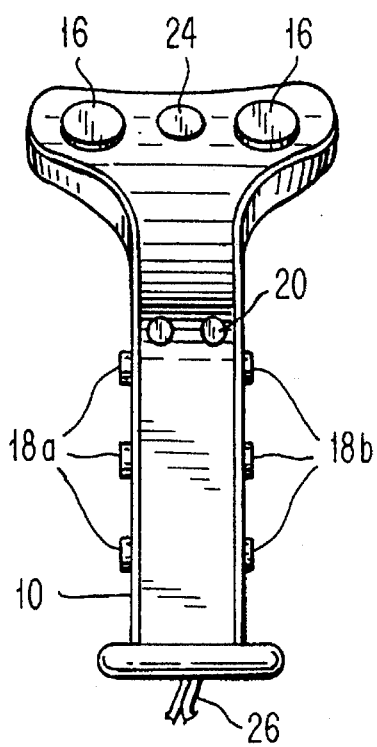
FIG. 1A and 1B are front and side view respectively of the cap of and analog input device in the hand held device according the present invention.

The body 10 of the hand held device can be formed from any conveniently formable material, such as a castable or moldable plastic or metal. ABS or polycarbonate gives a reasonable combination of strength, weight and workability, for example. The hand held control device can be explicitly made for the right or left hand or can be equally well fitted for either hand. Fitting for either hand seems to be the best approach for airport ground control applications, since controllers are in the habit of switching their hand units between hands. The body 10 is in the form of a shell of a thickness sufficient to give the requisite strength and rigidity. It can be made in one piece or it can be made in two piece fastened together. Additional weight beyond the minimal require for strength may be desired and can be provide by using additional thickness of material.

The top surface 12 of the body 10 is shaped for optimal access by the thumb with the base of the thumb aligned along the back center line 14 of the body. It is slightly concave fore and aft, and more so side to side, which also affords a degree of protection from accidental impact of the sensors which it carries.

The various control elements or sensors are mounted in openings of the body shell or in surface concavities if its thickness is sufficient. The primary implementation uses control elements or sensors of three kinds: simple two position button switches shown as 16, 18 and 20; a four position switch 22; and a two and half dimensional pointing stick 24.

The two position switches 16, 18 and 20 may be of any type which are sufficiently small, such as NKK Flat Blue Buttons. The contact surface should be large enough to cradle the fingertip or give a comfortable target for the thumb depending upon the location. The switch activation force profile must strike a compromise between ease of use and adequate tactile feedback.

Figure 1B:
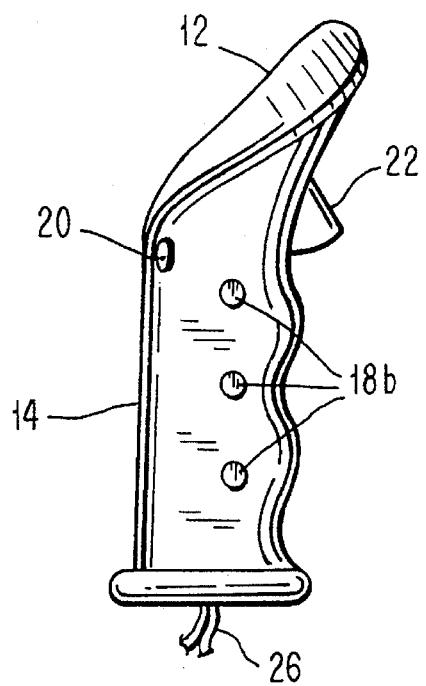

The simple two position button switches, shown as 20, are used as chirality detector switches and are located at positions such that on corresponding one will be gripped firmly when the device is held in the corresponding hand, in operable position, and not touched when the device is held in the other hand. The locations indicated as 20 in FIG. 1 are appropriate. The chirality detector can have a lighter operating force than the other switches. All of the control elements or switches on the lower part of the hand held control device must be essentially flush with the surface of the body 10 so as to be nonobtrusive when pressed against the hand and must be sufficiently dished to be effortlessly located by the fingertips.

Figure 3:
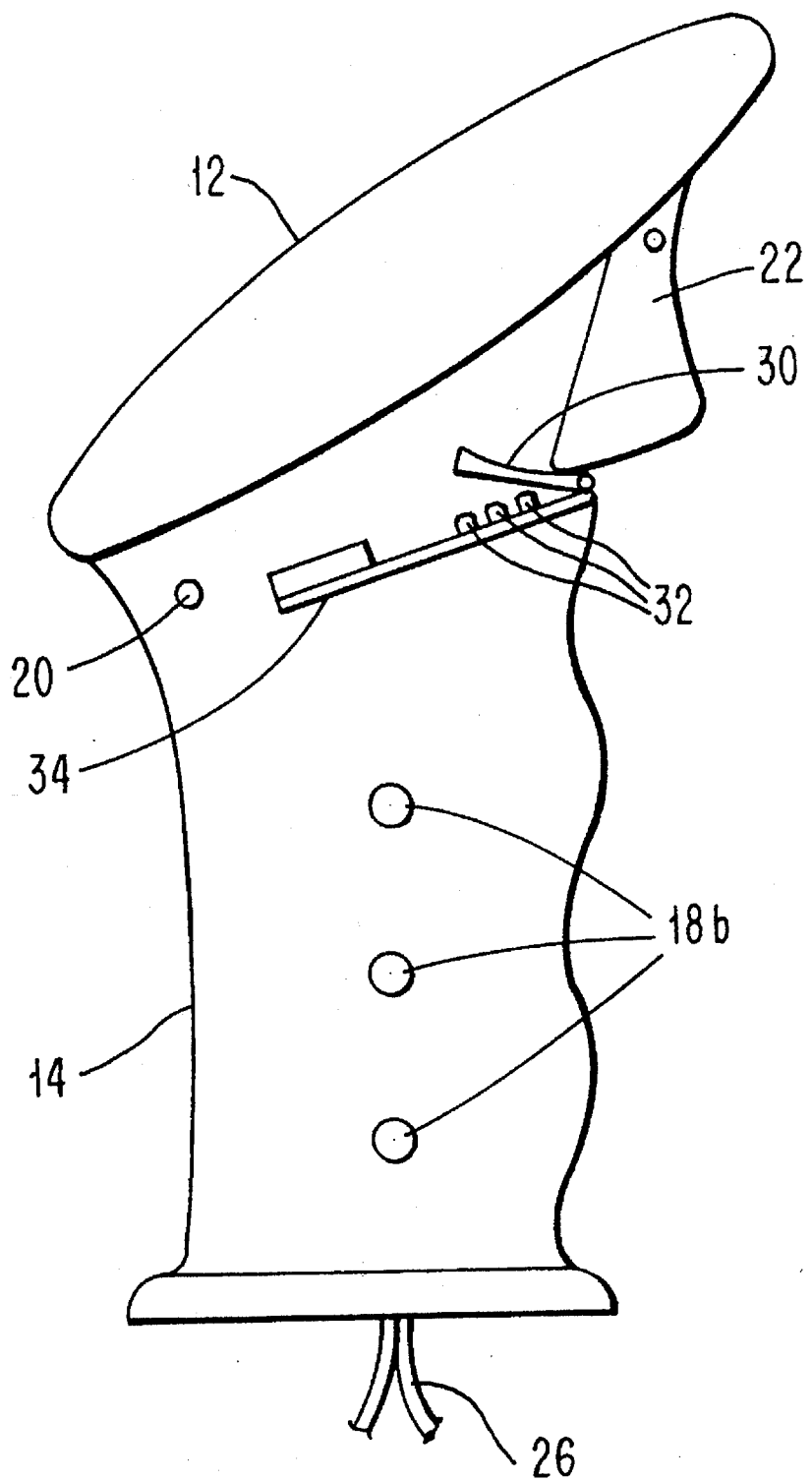
FIG. 3 is drawing illustrating a four position switch embodied in the present invention.

A four position trigger control element or switch is mounted on the front center line of the body, where it will lie under the distal joint of the index finger. It is of the type that provides four different switch positions with forces adjusted to give low fatigue in long term operation, but adequate tactile feedback of position in transitions, that is, a good click at each transition and a noticeable, but not fatiguing force is required for maintenance of the on positions. An embodiment of a four position switch is shown in FIG. 3 wherein trigger 22 activates a guide plate 30 which closes microswitches 32 positioned on sensing arm 34. Depending on the closure of the three microswitches 32, four different electrical conditions can be activated.

In an air traffic control situation the positions of the four position switch may be voice channel off (from a microphone 62 of headset 56), communications channel on (between headset 56 and computer system 52), voice recognition system 64 on and both communications and voice recognition on. Each position of the four position switch should have a different "sense" or "feel" so that it is easy to know what function of the switch is being activated.

Figure 2A:
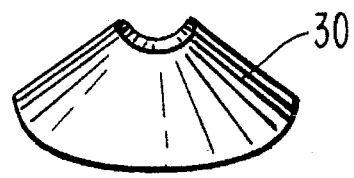
FIG. 2A–C are perspective, side and plan views of the present invention.
Figure 2B:
Figure 2C:
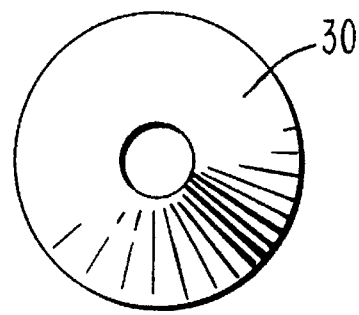

The pointing stick may be of the two or three dimensional variety. The operating surface should be protected from accidental impact since the device may be dropped or thrown, its edges should be flush with the body surface or slightly recessed and of a size sufficient to accommodate the thumb. The surface texture should be such as to give a firm grip and sensation of control. Possibilities include a pattern of grooves, a cup surface and a volcano shape, as shown in FIG. 2, element 30. This can be formed in either a rigid or a firm rubber-like material with nonskid surface. X and Y direction surfaces are interpreted according to normal pointing stick algorithms. In the primary implementation, only this surface is available for contact, so that the z-axis output is of limited use. The z-axis force is required for applying X and Y force and upward force is not available. The pointing stick feature of the hand held control device can supply at least a binary signal, that is the pointing stick can serve as its own select or enter button responding to a downward pulse with a binary signal, while suppressing any simultaneous X or Y excursion.

The tactile feedback unit 54, in its simplest form, is a buzzer which when pulsed produces a distinct twitching sensation in the hand holding the device. More sophisticated device including those in which a solenoid accelerates a mass which them impacts a stop, giving a sharp acceleration along a definite axis. Several such directions should be distinguishable. Condenser storage can be used to supply the current pulse required. This form of output can be used, for example, in scanning a list on a visual display. As a cursor crosses each boundary, a twitch is delivered, cognitively analogous to the sensation one would receive running one's finger down a physical bulletin board with slots for each list item. Other applications would be for a variety of alarm or please notice events.

The data processing and analog conversion unit 50 has been implemented in a unit built around a Signetics 87C752-1N28 microcomputer which fits into the available space and requires only about 20 milliwatts of power. Other technology could be used which would allow increased function and reduce space and power requirements. The organization of this processor system is described in known patents.

Two-way communications can be achieved by infrared technology or radio transmission 60 from the hand held device 10 to a transceiver 66 in computer system 52. Leads 26 can be part of the transmission means. Conceivably, a powerful processor 52 would allow multiplexing of many two-way communications.

In an alternative implementation, the body is a long flattened cylinder which is held like a wand, and pointed at the receiving station. The switches and pointing stick are placed on the upper surface flattened surface, convenient to the thumb, and optionally on the sides of the cylinder, under the finger tips. This implementation is more appropriate where the communication requirements do not include the four-position switch.

What has been described, is a hand held control device useful anywhere a computer is being used to control or participate in a scenario in which a user's attention should primarily be on something which disallows a fixed sitting position, or in which a conventional keyboard is not required and one-handed control with mobility is desired. Such situations include factory control, traffic control, machinery operation, video game playing, along with airport traffic control.

What is claimed is:

1. A hand held control device comprising:
    a rigid body adapted for being gripped and carried by a single hand of a user while leaving the thumb and finger tips of said gripping and carrying hand free to operate control elements mounted in said rigid body;
    a plurality of control elements mounted in the rigid body for activation by a thumb or finger tip of said gripping and carrying hand to generate control data;

transmission means located in the rigid body for communicating said control data between the hand held control device and a remotely located computing system having a display;

at least one of said control elements being a pointing stick for controlling in a joystick-like manner actions at said display;

at least one of said control elements corresponding to a left gripping and carrying hand-and being mounted on the rigid body for activation only by a finger tip of said gripping and carrying hand when said gripping and carrying hand is a left hand and at least one other one of said control elements corresponding to a right gripping and carrying hand and being mounted on the rigid body for activation only by a finger tip of said gripping and carrying hand when said gripping and carrying hand is a right hand: and a chirality detector mounted in the rigid body for automatically sensing whether said gripping and carrying hand is a left hand or a right hand and automatically enabling said control elements corresponding thereto.

2. The hand held control device of claim 1 wherein the control elements include a four position switch.

3. The hand held control device of claim 2 wherein the four position switch controls voice communications through the device to a remotely located computer system.

4. The hand held control device of claim 1 having a feedback means for signaling the user of the device of an occurrence of selected conditions.

\* \* \* \* \*